US008494660B2

(12) United States Patent
Engelen

(10) Patent No.: US 8,494,660 B2
(45) Date of Patent: Jul. 23, 2013

(54) METHOD AND COMPUTER IMPLEMENTED APPARATUS FOR CONTROLLING A LIGHTING INFRASTRUCTURE

(75) Inventor: Dirk Valentinus Rene Engelen, Heusden-zolder (BE)

(73) Assignee: Koninklijke Philips N.V., Eindhoven (NL)

( * ) Notice: Subject to any disclaimer, the term of this patent is extended or adjusted under 35 U.S.C. 154(b) by 285 days.

(21) Appl. No.: 13/002,592

(22) PCT Filed: Jul. 3, 2009

(86) PCT No.: PCT/IB2009/052890
§ 371 (c)(1),
(2), (4) Date: Jan. 4, 2011

(87) PCT Pub. No.: WO2010/004488
PCT Pub. Date: Jan. 14, 2010

(65) Prior Publication Data

US 2011/0112691 A1 May 12, 2011

(30) Foreign Application Priority Data

Jul. 11, 2008 (EP) .................................... 08104724

(51) Int. Cl.
*G05B 11/01* (2006.01)

(52) U.S. Cl.
USPC .............................. 700/19; 315/312; 715/200

(58) Field of Classification Search
USPC .............................. 700/19; 315/312; 715/200
See application file for complete search history.

(56) References Cited

U.S. PATENT DOCUMENTS

2005/0246628 A1* 11/2005 Peterson ....................... 715/513
2005/0248299 A1* 11/2005 Chemel et al. ................ 315/312
2006/0076908 A1* 4/2006 Morgan et al. ................ 315/312
2007/0089026 A1* 4/2007 Uchida ......................... 714/758

FOREIGN PATENT DOCUMENTS

WO 2007069143 A2 6/2007
WO 2007110791 A1 10/2007
WO 2008001259 A2 1/2008
WO 2008038188 A2 4/2008
WO 2008104927 A2 9/2008

* cited by examiner

*Primary Examiner* — Mohammad Ali
*Assistant Examiner* — Anthony Whittington
(74) *Attorney, Agent, or Firm* — John F. Salazar; Mark L. Beloborodov

(57) ABSTRACT

The invention relates to the control of a lighting infrastructure such as a complex lighting system. An embodiment of the invention provides a method for controlling a lighting infrastructure by means of a computer comprising the acts of generating a single room view (10) of a room with the lighting infrastructure by combining different views of the room on a display (12; S10), —receiving and processing of input signals (14) with regard to the generated single room view (S12), and —creating output signals (16) for controlling the lighting infrastructure in response to the processed input signals (S14). The single room view allows an intuitive control of a lighting infrastructure similar to a computer paint program.

8 Claims, 5 Drawing Sheets

METHOD AND COMPUTER IMPLEMENTED APPARATUS FOR CONTROLLING A LIGHTING INFRASTRUCTURE

FIELD OF THE INVENTION

The invention relates to the control of a lighting infrastructure such as a complex lighting system.

BACKGROUND OF THE INVENTION

With the introduction of LED (Light Emitting Diode) based lighting in home and professional environments, people will have the possibility to create and change the perceived atmosphere of the environment. People know the possibility of dimming the lighting level and switching on spotlights to increase the coziness in the environment. On short term, they will have the possibility to create more atmospheres by using LED lighting on walls and objects, by changing the color temperature of the ambient lighting in the room, or by creating spots of lights to support their activities. The increase in possibilities is at the cost of an increase in the amount of controls. For a complex lighting infrastructure with a plurality of different light units or lamps, simple control tools like switches or a dimming wheel will not be sufficient for people to create desired lighting atmospheres. All these tools are known to the user, but these control devices can only influence a single lamp, or a group of lamps. In shops or meeting rooms a more complex lighting infrastructure is present. To create and modify the light atmosphere, typically an installer is asked to program some light scenes: the installer will usually cluster some lights in groups, and provide control values for the groups or for individual lamps. These control values are then stored as a scene. And the user is limited to recall the pre-programmed scenes only. But when the user would like to create or adapt a lighting atmosphere himself, a more intuitive interface is needed.

US2007/0189026A1 disclose methods and systems for supplying control signals for lighting systems, including methods and systems for authoring effects and shows for lighting systems. In an embodiment, a method for generating control signals for a lighting system is provided, which involves generating an image or representation of an image such as an explosion in a room for example. This image may be used to generate control signals.

SUMMARY OF THE INVENTION

It is an object of the present invention to provide a method and a computer implemented apparatus for controlling a lighting infrastructure, which may make it easier and more intuitive for users to create lighting scenes or atmospheres with the lighting infrastructure.

The object is solved by the subject matter of the independent claims. Further embodiments are shown by the dependent claims.

A basic idea of this invention is to create a single room view of a three dimensional room with a lighting infrastructure, which makes it easier and more intuitive for users to control the lighting infrastructure. A single room view is a two-dimensional combination of different views of the room in order to reduce the dimension of the complexity of lighting infrastructure control in the room. Particularly, the single room view is created by combining different views of surfaces with lighting effects, such as different walls of the room, which may be illuminated by light units such as wall washers illuminating a wall of the room or spotlights directed to a wall of the room, and virtual views for modeling lighting effects created by for example a light unit which provides some general lighting to a room. A single room view makes it more easy and intuitive for a user to control a lighting infrastructure since it allows the user to create light effects similar to the usage of computer paint programs.

An embodiment of the invention provides a method for controlling a lighting infrastructure by means of a computer comprising the acts of generating a single room view of a room with the lighting infrastructure by combining different views of the room on a display, receiving and processing of input signals with regard to the generated single room view, and creating output signals for controlling the lighting infrastructure in response to the processed input signals.

A user may more easily and intuitively control a lighting infrastructure such as a lighting system in her/his home with several different light units, such as spotlights, wallwashers, etc. The single room view allows the user to create a desired lighting atmosphere or scene in a room similar as done with a computer paint program, for example by designing light effects in the displayed single room view.

According to a further embodiment of the invention, the act of creating a single room view of a room may comprise combining views of surfaces of the room with lighting effects and virtual views of the room for modeling lighting effects in the room.

For example, walls of room with installed wallwashers can be combined with a virtual view of the floor of the room at a certain level to a single room view. In such a single room view, sample points may be defined at locations of the room, where the effect of a light control is maximal. This allows reducing the dimension of the problem of modeling lighting effects in the room.

The act of receiving and processing input signals may in an embodiment of the invention comprise receiving an user input from input means, assigning the received user input to one or more light effects on the environment or light units of the lighting infrastructure, determining a lighting effect from the received user input, and generating control signals for the one or more light units with regard to the determined lighting effect. For example, a user input may be for example an input with a pointing device such as a mouse via a graphical user interface (GUI) of a computer executing the method. The input may comprise select and click commands, such as selecting a certain area of the room displayed with the single room view, and clicking on for example a color filling button for filling the selected area with a desired lighting color. The so received user input may then automatically assigned to the light units, which are suitable to create the desired light effect in the room, for example by analyzing the lighting infrastructure and selecting light units located at or which have a light effect in the selected area and being able to produce a light with the desired color. The determined lighting effect from the user input, for example the creation of the desired lighting color may then be used to automatically create the suitable control signals, such as control signals addressing the assigned light units and controlling the addressed light units to create the light with the desired lighting color.

The determining of a lighting effect from the received user input may in a further embodiment of the invention comprise determining a color distribution, which is specified in a lighting device independent color space. Thus, a user desired lighting color may be displayed on a computer screen so that it essentially matches the lighting color in reality.

The lighting device independent color space may be for example one of the following: CIE XYZ; CIE xyY; Computer RGB.

According to a further embodiment of the invention, the determining of a lighting effect from the received user input may comprise determining an intensity distribution of lighting in the room. This allows inputting also an intensity distribution of the lighting by a user, for example by defining points of different intensity in a selected area of the single room view.

Furthermore, the determining of a lighting effect from the received user input may comprise determining a color temperature of lighting in the room in an embodiment of the invention. For example, a user may input a desired color temperature of lighting in a selected area of the single room view.

In a further embodiment of the invention, the act of receiving and processing of input signals with regard to the generated single room view may further comprise receiving as an user input from input means a drag and drop operation of a graphical representation of a lamp into the single room view and indicating the effect of the lamp on floor and walls in the single room view. This allows a user to display lighting effects of lamps at different locations, similar to a home/office planner application, which allows a user to virtually plan the furniture in a room. With the single room view, a user may easily determine whether the light effect of user placed light unit is desired or not.

A further embodiment of the invention provides that the act of creating output signals for controlling the lighting infrastructure in response to the processed input signals may comprise translating a color and intensity distribution of lighting into control values by means of a computer model of the lighting infrastructure and creating the control signals from the control values. The computer model of the lighting infrastructure is used to "transfer" a virtual lighting design into a concrete embodiment of a lighting infrastructure in that it is used to create the control values for the lighting infrastructure required for creating the desired lighting. Thus, the computer model may be regarded as a kind of abstraction layer, which may be replaced depending on the lighting infrastructure to be controlled.

The method may comprise in a further embodiment of the invention the acts of

- receiving and processing of control signals from the lighting infrastructure and
- displaying a distribution of color and intensity values of the lighting in response to the processed control signals in the single room view of the room with the lighting infrastructure. Thus, also the actual lighting situation in the room may be represented in the single room view and assist a user in her/his control of the lighting infrastructure. This is also useful if the control of the lights of the lighting infrastructure can also be changed by other tools such as dimmers or switches, since any light change may be reflected in the single room view.

According to a further embodiment of the invention, a computer program may be provided, which is enabled to carry out the above method according to the invention when executed by a computer. Thus, the method according to the invention may be applied for example to existing lighting infrastructures and are adapted to execute computer programs, provided for example over a download connection or via a record carrier.

According to a further embodiment of the invention, a record carrier storing a computer program according to the invention may be provided, for example a CD-ROM, a DVD, a memory card, a diskette, or a similar data carrier suitable to store the computer program for electronic access.

A further embodiment of the invention provides a computer programmed to perform a method according to the invention and comprising an interface for communication with the lighting infrastructure. The computer may be for example a PC (Personal Computer) with an operating system with a graphical user interface (GUI), which may display the single room view and the user interface for controlling the lighting infrastructure according to the invention in a window system similar to a computer paint program, thus allowing users to comfortably and intuitively control the lighting infrastructure with familiar user controls known from the paint programs such as area selection tools, flood fill tools, airbrush tools or the like.

According to a further embodiment of the invention, a computer implemented apparatus for controlling a lighting infrastructure is provided, wherein the apparatus comprises

- processing means being adapted for generating a single room view of a room with the lighting infrastructure by combining different views of the room on a display and for receiving and processing of input signals with regard to the generated single room view, and
- a controller being adapted for creating output signals for controlling the lighting infrastructure in response to the processed input signals.

According to a further embodiment of the invention, the apparatus may be adapted to receive control signals and may further comprise a view renderer being adapted to change the color and/or intensity distribution in the single room view in response to the received control signals. The control signals may be received for example from other light control changers such as dimmers and switches or from one or more cameras monitoring the room. Thus, the lighting atmosphere in a room may be displayed with the single room view and a user may easily and intuitively adjust and create a desired lighting atmosphere or scene in the room. The view renderer may be implemented by a software, which is executed by the apparatus and may comprise an inverse model of the lighting infrastructure, thus enabling a "kind" of feedback from the lighting infrastructure to the single room view.

The apparatus may be in an embodiment of the invention being adapted to perform a method of the invention and as described above.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
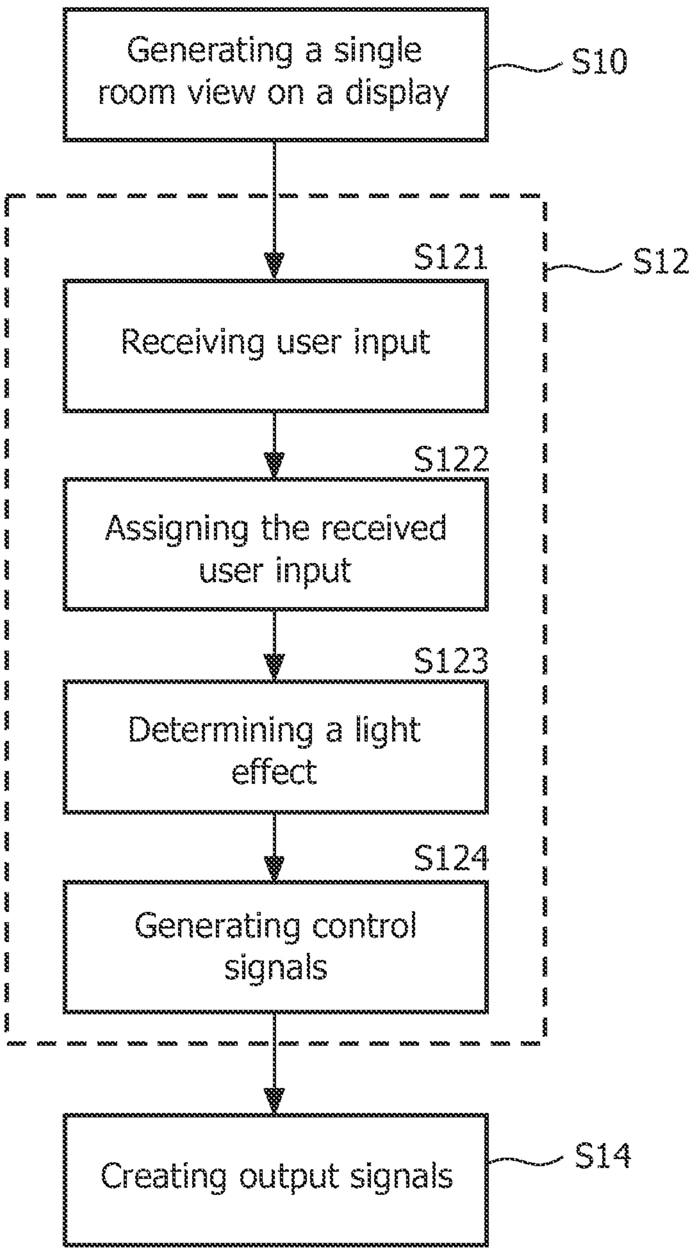
FIG. 1 shows a flow chart of an embodiment of a method for controlling a lighting infrastructure by means of a computer.

In the following, functionally similar or identical elements may have the same reference numerals.

FIG. 1 shows a flowchart of a method for controlling a lighting infrastructure by means of a computer-implemented apparatus that uses a single view on a room where the lights have to be controlled by creating color and intensity distributions in the view. The apparatus can be a computer, tablet PC or handheld computer, but also simpler embodiments (like a photo-frame) can be used as user interface. The method is implemented as a computer program, which is executed by apparatus.

The computer program is adapted to generate the single view on a room or briefly called a single room view 10 (FIG. 4) of a room with the lighting infrastructure 20 by combining different views of the room on a display such as a computer monitor 12 (step S10 of the flowchart). The single room view 10 may be generated by reading in data regarding the room with the lighting infrastructure 20, for example from a data carrier comprising digital data of the room and the lighting infrastructure or be downloading the digital data via a network connection of the apparatus. The digital data typically comprise a model of the room with the lighting infrastructure installed in the room. The model may be a three-dimensional model with the dimensions of the room and of its walls. It also may comprise data regarding furniture, especially of fixed furniture.

The computer program also receives and processes input signals 14 of the apparatus with regard to the generated single room view (step S12). The input signals may be received from input means of the apparatus such as a keyboard, a mouse, a tablet, a pointer.

Furthermore, the computer program creates output signals 16 for controlling the lighting infrastructure 20 in response to the processed input signals (step S14). The creating of the output signals may be performed by the computer program in near real time so that a user can immediately see the changes of a lighting atmosphere or scene created with the single room view, or the output signals may be created after a user has designed a desired lighting atmosphere or scene and initiates a command for processing the output signals and for transferring the created output signals to the lighting infrastructure 20 for rendering the desired lighting atmosphere or scene. The transmission of the output signals may be performed either wired over for example a wired network connection between the apparatus and a lighting atmosphere or scene rendering machine, or it may be transmitted via wireless communication connection such as a NFC (Near Filed Communication) connection, for example Bluetooth®, Zigbee™, or WLAN (Wireless Local Area Network).

Typically, the rendering of the created lighting atmosphere or scene is performed automatically with the rendering machine, which is adapted to receive the output signals from the computer program and create from the received output signals respective control signals for the lighting infrastructure. The rendering machine may be implemented as software and processed on a computer, for example a separate computer or the apparatus itself (in the latter case, the output signals are internally passed from one computer program to another computer program which implements the rendering machine).

The act of receiving and processing input signals (step S12 performed by the computer program) comprises

- receiving an user input from the input means (step S121),
- assigning the received user input to one or more light effects on the environment or light units of the lighting infrastructure (step S122), for example assigning a color lighting of a certain wall of the room to a wallwasher assigned to the wall,
- determining a lighting effect from the received user input (step S123), for example determining a red color lighting of a certain wall of the room, and
- generating control signals for the one or more light units with regard to the determined lighting effect (step S124), for example generating control signals for a wallwasher to create a red color lighting of the wall.

Thus, the processing of the input signals is comparable to automatically analyzing the received user inputs with regard to the single room view and to relieve the user from selecting certain lamps, to check whether these lamps are able to create a desired lighting effect, and finally to control these lamps to create the desired lighting effect. In other words, the computer program is adapted to automatically map an intuitive user input to control signals for a lighting infrastructure.

Figure 2:
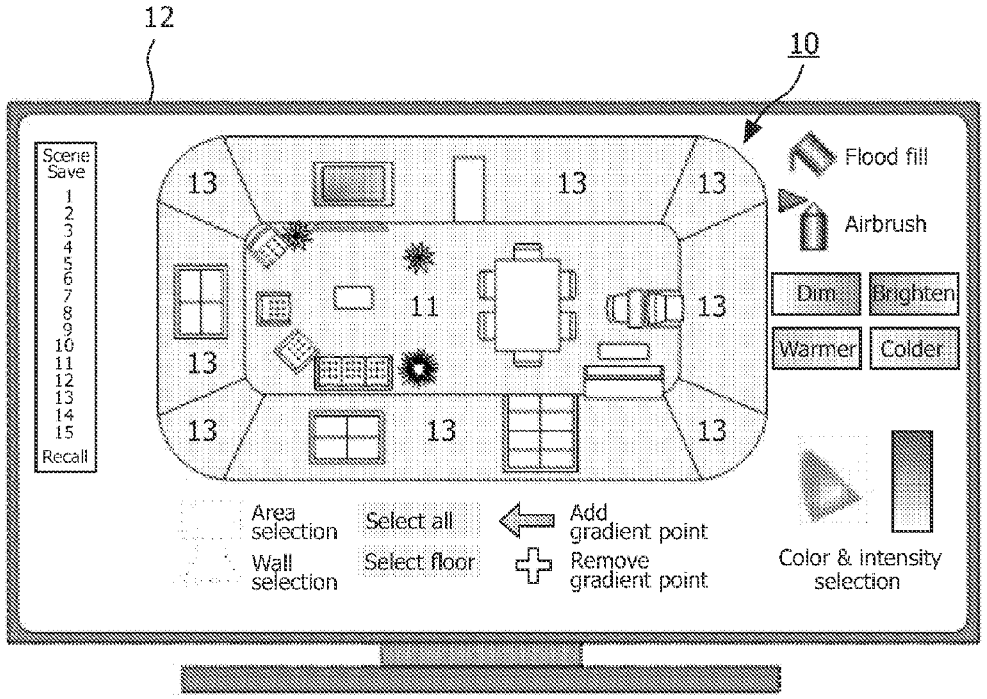
FIG. 2 shows a first example screen of a single room view with edit tools to control a lighting infrastructure, wherein the screen is created by an embodiment of a computer program according to the invention.

FIG. 2 shows an example of a single room view 10 according to the invention, with tools for controlling a lighting infrastructure, on a computer screen 12. The single room view 10 is a top view on the room floor 11 combined with a view on all the room walls 13 so that an intuitive two-dimensional view of the complete room is generated. In this single room view, a distribution of light intensity and color values may be placed on top of the room layout by a user. The distribution layer is transparent such that the room layout and objects in the layout remain visible. The color and intensity distribution can be changed by the user by applying some paint tools:

- The area selection tool (bottom of the screen) gives the possibility to select a part of the view, where some operations are executed. The wall selection tool is used to indicate one of the walls. With the Select All and Select Floor, the complete or the floor distribution is selected for modification.
- The Flood Fill tool paints the selected area with a single color or intensity value.
- The Airbrush tool gives the possibility to change the values in the complete area or a selected part. It is operated by selecting it, and dragging the tool over the color/intensity distribution. When using the Airbrush, only the values that are in the neighborhood of the Airbrush are changed slightly, according to the selected activity.
- Possible activities in the single room view are:
- Dim or brighten the light: the intensity values in the distribution (e.g. luminance on the wall or illuminance on the virtual plane) are decreased or increased
- Make the light warmer or colder. This is done by shifting the color towards a warmer (more red) or colder (more blue) color.
- Select a target color+intensity. When using the area tool, the complete area is painted in this target color and intensity. When using the paintbrush, the values of the distribution are changed gradually towards the selected color/intensity point.
- Creating gradients is possible by a combination of tools. First an area is selected (e.g. a wall, or a part of a wall). Then the "Add gradient point" tool is activated, and a color and intensity value is selected. With the "Add gradient point" tool, a location in the selected area is clicked. A new color/intensity value is selected and another location is clicked. Between those points, the color/intensity values shift from the first selected color/intensity value in the first point, to the second selected value in the second point.

When the color/intensity distribution is changed, new controls for the lighting infrastructure are calculated and sent to the lighting infrastructure. This changes the lighting in the environment accordingly.

The actions are not limited to the ones illustrated here. In paint programs, there are other tools to change a color distribution, and these tools can be used to change the color and intensity distribution on the single room view: other ways for creating color gradients, area selectors that can select any shapes, a magic wand for selecting an area with a similar color or intensity values, tools to spread out color or intensity values, like a flood fill tool, a paintbrush, an eraser etcetera. The color distribution can be specified in a device independent color space like CIE XYZ, CIE xyY or in a computer RGB space. A xyY color space can be used to cover both the wall 13 and floor 11 view. The xy pair indicates the color point while Y can be interpreted as the luminance of the wall or the illuminance on the virtual view.

In order to use the invention, some steps are needed for preparation.

These preparation steps comprise:

Drawing the floor layout of the room, and extending this with a view on all the walls. Also details like furniture, doors and windows may be included. This can be done by the user, an installer of the lighting infrastructure, or via an automatic procedure that translates camera pictures in a 3D model and then in this floor layout with wall view. Possibly, the color and texture of wall paper can be drawn in the view.

Putting the sample points in the view. Sample points are placed where the lights have a maximum or representative effect. The sample points can be estimated by a user or installer of the system, or they can be derived by automatic procedures. When derived automatically, with a so-called dark room calibration method, the influences of the controls of the lighting infrastructure may be measured. Using these measurements, interesting points on the wall can be derived, and located in the single room view.

Relating the sample points to the controls of the lighting infrastructure. This results in the model that translates the color/intensity values into the controls for the lighting infrastructure. This can be done by a rough estimation. For example, the color/intensity distribution can be specified in (red, green, blue) values, the sample points are located where the controls of for example LED wallwashers have a maximum effect, so the RGB value in the sample point can directly be used to drive the LED lamp that has its max effect on the location indicated by the sample point.

The single room view can also be used to control the light distributions in more then one room at a time, and may be valid for other room shapes than the rectangular one, shown in the example of FIG. 2. This is only a matter of finding a good way to combine the floor view with good views on all the walls, and present this to the user.

Figure 3:
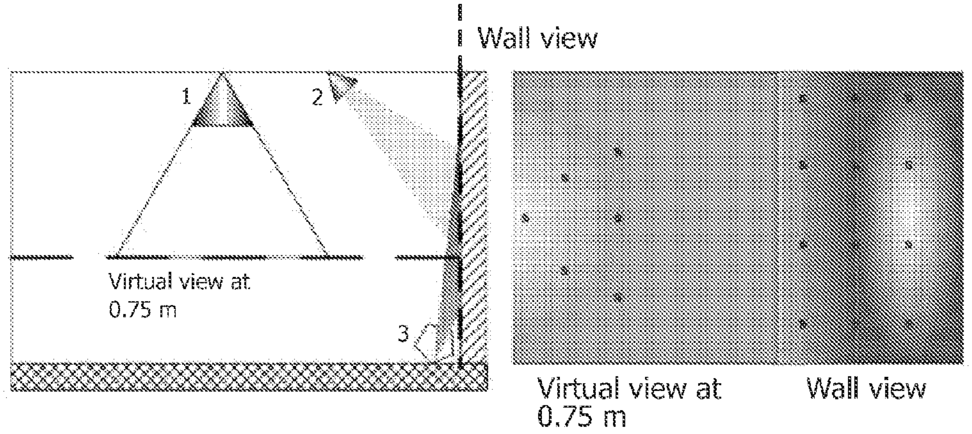
FIG. 3 shows the combining of a virtual and a wall view in a single view according to the invention.

FIG. 3 illustrates the processing of a lighting distribution in the single room view by means of an example: on the left, the picture shows a light 1 that provides some general lighting to a room, spot 2 illuminates a wall and light 3 is used to create a color distribution on a wall. The effect on light 1 can be modeled by the effect it has on a (virtual) surface parallel to the floor. The effect of lights 2 and 3 can be modeled by describing their effect on the wall. Both the virtual view and the wall view can be combined into a single view, as shown in the right part of the figure. In this single view sample points may be defined to reduce the dimension of the problem. Sample points can be placed on locations where the effect of a light control is maximal. Some target values for intensity and color in these sample points may form the output signals to be processed by the rendering machine for creating the desired lighting distribution in the room or the desired lighting atmosphere or scene. Simply speaking, the rendering machine may determine the controls for the lights by mapping the color-light distribution represented by the sample points to the controls of the lighting infrastructure.

Figure 4:
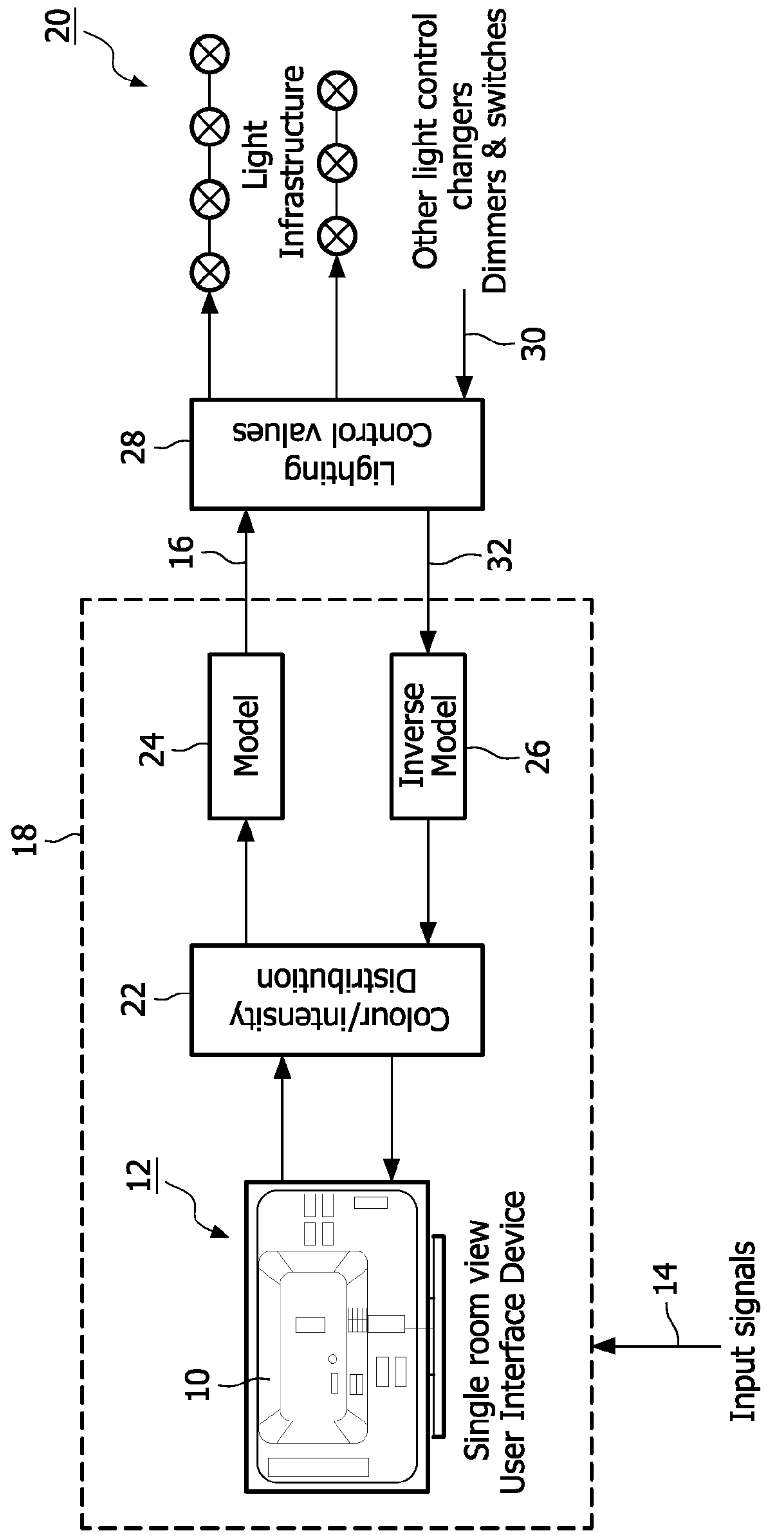
FIG. 4 shows an embodiment of a computer implemented apparatus for controlling a lighting infrastructure according to the invention.

The combined view can now be applied to define the interaction on the computer-implemented apparatus that uses a single view on a room where the lights have to be controlled by creating color and intensity distributions in the view, for example a computer, tablet PC or handheld computer, a digital photo-frame, all of which may be used as a user interface. FIG. 4 shows a system view of the apparatus 18, which comprises the display 12 displaying the single room view 10, a color/intensity distribution processing module 22, a lighting infrastructure model 24 and an inverse lighting infrastructure model 26. The apparatus may receive input signals 14, which may be signals from a keyboard, a tablet, a mouse, a pointer, a touch screen or the like. The color/intensity distribution model 22 processes from the received input signals 14 changes of the color/intensity distribution in the lighting infrastructure 20 installed in the room and pass the processed color/intensity distribution to the model 24, which translates the received distribution into control values for driving the lighting infrastructure 20. These control values are output as output signals 16 to the rendering machine 28 for processing the lighting control values for the lighting infrastructure 20. On the other hand, when the control values of the lighting infrastructure 20 are changed by some external light controls (dimmers, switches), a color/intensity distribution can be derived from that by applying the change signals 30 to the rendering machine, which maps the received signals to input signals 32 for the inverse model 26. The changed distribution can then be represented in the single room view UI device 12. The external light controls may also comprise sensors such as cameras or photosensors, which may detect the current lighting in the room. Thus, the single room view can also reflect the current lighting atmosphere or scene in a room on the display 12, allowing a user to adjust the current lighting scene.

In the following, a further embodiment of the present invention is described, which allows to easily integrate light units or lamps into a lighting infrastructure of a room. Current lighting systems in homes are installed by wiring lamps to controls (switches, dimmers). Mostly, the controls will operate on the electric current directly, or through ballasts. However, more and more modern light units and devices break with this traditional form of lighting control, and may be for example controlled with a kind remote control such as the LivingColors™ lamp of the Applicant. This new LED lamp allows also controlling the lighting color with the remote control, not only the intensity. Also other types of lamps will be introduced in the homes: LED based candle lights, small LED wallwashers, LED lights for integration into furniture and other LED based effect lights. Also consumer electronic devices may comprise and/or control light units such as the AmbiLight™ TV's of the Applicant and the amBX™ sets of the Applicant, which are provided for creating an effect lighting for computer gaming.

However, in most cases these light generating devices have their own isolated ways of control. This makes it difficult to use them all to shift the lighting atmosphere in a coherent way. To integrate all these light generating devices into a single light control system, values for the light controls need to be determined. The values may be determined by one or more applications that provide task or atmosphere lighting in the room. To use the maximum possibilities of the available lighting system, the relation between the controls and the effects of the lights in the room should be provided.

According to an embodiment of the present invention, these kind of lights may be commissioned (or proposed) in a lighting system or infrastructure by drag- and dropping a two dimensional graphic representation of the lamp into the 2D single room view of the environment or room. Together with the lamp, a two dimensional graphic representation of the light effect is dragged into the view. The borders between floor and wall are taken into account while dragging the lamp and the effect.

The user can also fine-tune the effect of the lamps and the single room view

- After the lamps are placed, the direction of the effect can be fine-tuned.
- E.g. the direction of spotlights can be indicated.
- Photographs of the walls can be used to enrich the single room view. Finally, from this 2D view, the user can switch to other views.
- A semi 3D view, where the ceiling is expanded to the outer size of the view. See FIG. 7.
- A full 3D view. This means that 3D representations of objects and lamps are known or can be derived (e.g. from photographs).

As described above, the single room view according to the present invention combines a view on the floor/ceiling with the views on all the walls. By doing this, the light system and environment can be represented as a simple two dimensional image, and the desired light effect can be edited in a similar way as done with a normal picture paint program. FIG. 2 illustrates such an interface, where a user can recall and save light scenes (left side of the screen), and can edit a lighting situation by selecting a tool (flood fill, airbrush) and target light effect (color, intensity) or modifier (dim-brighten, warmer-colder light).

The target light effect in the single room view can be automatically translated into light controls. The single room view can be considered as a view in which the target light effect is painted, and the lamp controls can be calculated. For doing this, the relation between the lamp controls and the location and kind of the effects of the lighting is used. This relation can be for example determined by modeling and measurement approaches. These approaches however are mostly too difficult and too complex for home users to execute.

Figure 5:
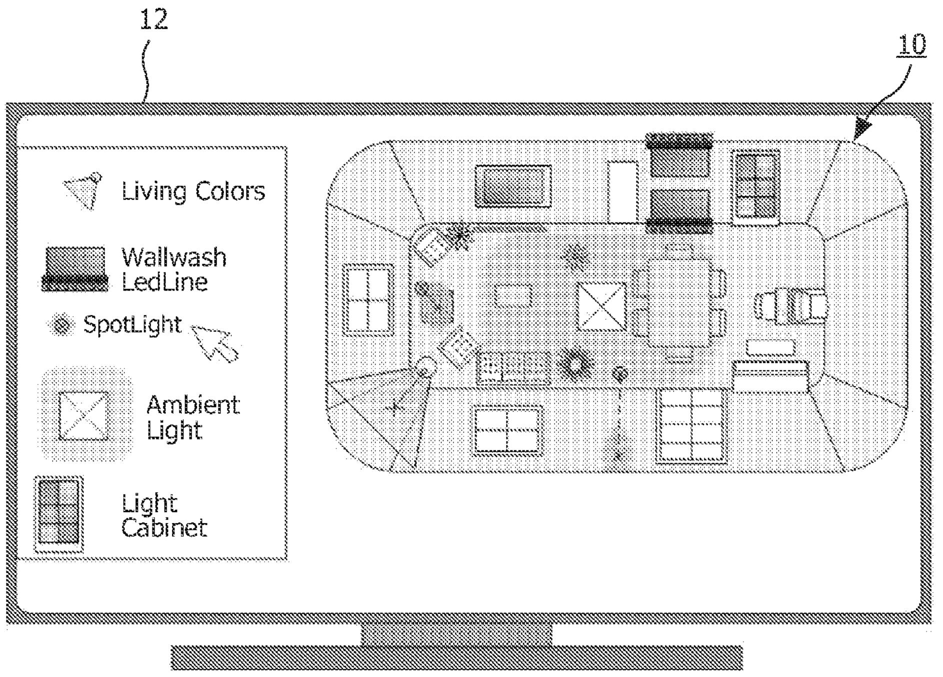
FIG. 5 shows a second example screen of a single room view with lamp representations to control a lighting infrastructure, wherein the screen is created by an embodiment of a computer program according to the invention.

In FIG. 5, the same room as shown in FIG. 2 is represented on a display 12 with a view on the lighting infrastructure. At the left side of the screen, several possible lamps and luminous furniture are presented, together with a representation of the light effect in the direction of the floor or as perceived from the wall. From this panel, lamps can be selected and dragged to the single room view 10. When dragging and after dropping the lamp into the view, the effect of the lamp on floor and wall is indicated.

Figure 6:
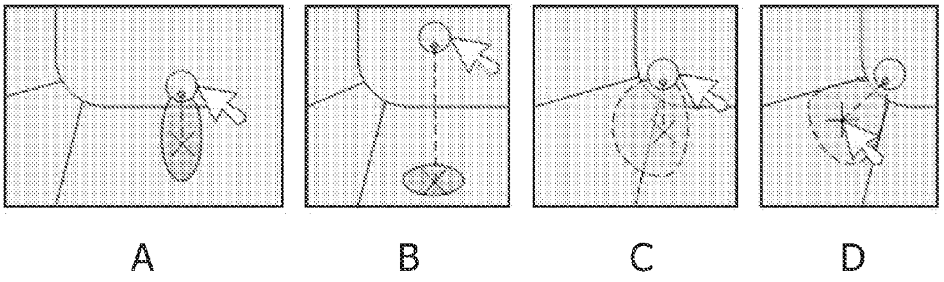
FIG. 6 illustrates the positioning of a lamp in the single room view of the screen of FIG. 2 according to the invention.

The effect of most of the lights (certainly the spotlights) can be directed towards a location on wall, floor or ceiling. After the light is dropped into the view, the location of the main effect or the centre of the beam can be adjusted by the user to reflect the planned or real positioning of the lamp. A symbol (like + or x) indicates this main effect of the lamp. The symbol is connected to the lamp with a line. Symbol plus line are also used to indicate the beam direction of the wallwash lights. FIG. 6 illustrates the positioning of a LivingColors™ lamp. First, it is dragged over the view (a and b), then, the lamp is positioned in a corner of the room (c). Finally, the main effect of the lamp is positioned in the corner itself (d). Effect and lamp appearance are adapted accordingly.

Figure 7:
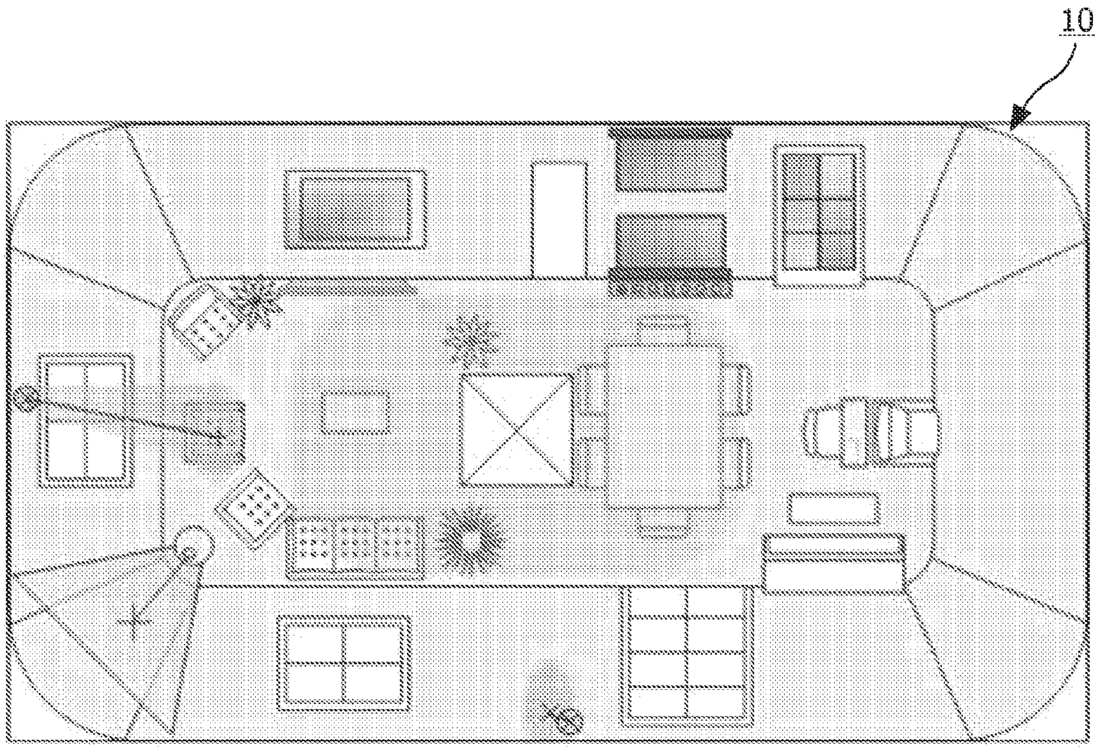
FIG. 7 shows a pseudo 3D view with an expanded ceiling as single room view according to the invention.

In most of the cases, it is clear if lamps are mounted at the ceiling (downlights) or if they are placed on the floor or wall, and have their effect upwards (e.g. wallwash lights). However, it might be useful to switch from a 2D single room view towards a pseudo or real 3D view. In the pseudo 3D view, the ceiling is expanded from the inner view (floor) to the outer view, as illustrated in FIG. 7. In this view, the icons that represent lights on the ceiling are expanded and moved to reflect their position in the ceiling view.

By drag and dropping the lamp icons in the single room view, and locating the main effect of the lamps, the location of the effect in the room is established. This information is used to transform the target effect, painted in these locations into the controls for the lamps that have their effect in these locations.

Physical lamps can announce themselves to the control system by using a device discovery protocol. Newly detected lamps can be placed by the system in a special area outside the single room view (see FIG. 5, area left to the view), and can then be dragged by the user into the view, such that their effect is located. By doing this, the relation between physical device and the representation in the Single Room View is established.

The wall view can be enhanced with photographs from the room. Algorithms and methods exist to detect important features (cupboard, TV, doors, border between floor and walls) and to morph these pictures into the single room view of the walls. This makes it possible to enhance the appearance of the view, but the pictures are not needed for the main purpose of the invention: locate the effect of the installed (and proposed) lamps in the room.

This embodiment of the present invention can be applied in those situations where lamps and other luminous objects and furniture should be brought under a single control system. In stead of a 3D representation, a 2D simplification of room, objects and light effects is made. This simplifies the way that home users can relate the lamps to the location of their effect in the room. Together with the lamp properties and address, the relation between control and effect is established. This makes it possible for other applications, to calculate the controls of the lighting system, such that a coherent shift of the atmosphere can be provided. Experience enhancing applications (AmbiLight™, amBX™) can have access to other lights to integrate them into the experience, or to dim them. The embodiment can be integrated in a light planning software tool such as the Philips Light Planner so that users can enter some simple properties of their environment or target room. They can enter their existing light infrastructure, together with the light generating devices such as LivingColor™ lamps, AmbiLight™ TV's, amBX™ lighting devices and the like and furniture, and they can evaluate the effect and possibilities of additional devices.

The single room view according to the present invention is an intuitive way to change the light distribution in a room. It can be used in a home or professional context, to change the lighting situation, and to create, save and recall light scenes.

It can also be used by lighting professionals to adjust the lighting situation in a reference environment: at this moment, they are limited to perform the changes on the control level of the light infrastructure, but with the single room view, they have to possibility to make changes on the effect level of the infrastructure. The effect level is more intuitive and more controls can be changed at a time. The single room view can also be used to represent the lighting situation based on the controls of the lighting infrastructure. When changing the control value of a lamp (e.g. by a dimmer), this situation can be reflected in the tool. The single room view can also be used in theatre and stage environment, to reflect the current lighting situation on stage, to create light scenes and to program light shows.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for controlling a lighting infrastructure comprising the acts of generating a single room view of a room with the lighting infrastructure by combining different views of the room on a display, receiving and processing of input signals associated with the generated single room view creating output signals for controlling the lighting infrastructure in response to the processed input signals, wherein the act of creating a single room view of a room includes combining views of surfaces of the room with lighting effects and virtual views of the room for modeling lighting effects in the room, wherein the act of receiving and processing input signals includes:

receiving an user input from input means, assigning the received user input to one or more light effects on the environment or light units of the lighting infrastructure, determining a lighting effect from the received user input, and generating control signals for the one or more light units associated with the determined lighting effect.

2. The method of claim 1, wherein the determining of a lighting effect from the received user input comprises determining a color distribution, which is specified in a lighting device independent color space.

3. The method of claim 2, wherein the lighting device independent color space is one of the following: CIE XYZ; CIE xyY; Computer RGB.

4. The method of claim 1, wherein the determining of a lighting effect from the received user input comprises determining an intensity distribution of lighting in the room.

5. The method of claim 1, wherein the determining of a lighting effect from the received user input comprises determining a color temperature of lighting in the room.

6. The method of claim 1, wherein the act of receiving and processing of input signals with regard to the generated single room view further comprises receiving as an user input from input means a drag and drop operation of a graphical representation of a lamp into the single room view and indicating the effect of the lamp on floor and walls in the single room view.

7. The method of claim 1, wherein the act of creating output signals for controlling the lighting infrastructure in response to the processed input signals comprises translating a color and intensity distribution of lighting into control values by means of a computer model of the lighting infrastructure and creating the control signals from the control values.

8. The method of claim 1, further comprising the acts of receiving and processing of control signals from the lighting infrastructure and displaying a distribution of color and intensity values of the lighting in response to the processed control signals in the single room view of the room with the lighting infrastructure.

* * * * *